J. J. FITZGERALD.
GAGE DEVICE.
APPLICATION FILED APR. 5, 1919.

1,347,022.

Patented July 20, 1920.

INVENTOR:
John J. Fitzgerald,
BY
ATTORNEY.

UNITED STATES PATENT OFFICE.

JOHN J. FITZGERALD, OF LOS ANGELES, CALIFORNIA.

GAGE DEVICE.

1,347,022.       Specification of Letters Patent.      Patented July 20, 1920.

Application filed April 5, 1919. Serial No. 287,877.

*To all whom it may concern:*

Be it known that I, JOHN J. FITZGERALD, a citizen of the United States, residing at Los Angeles, in the county of Los Angeles and State of California, have invented new and useful Improvements in Gage Devices, of which the following is a specification.

This invention relates to gage devices and particularly to that form of gage device which has an indicating member adapted to be projected from a housing, said indicating member having readings thereon, and the distance to which said indicating member is projected is read in relation to the housing. It has for its object to provide an improved device of the character disclosed, which will be generally superior in point of relative simplicity and inexpensiveness of construction, taken in connection with positiveness in operation, convenience in use, durability, compactness in form, etc.

Other objects are to provide an improved device which may readily measure the compression, in cylinders, such as compression in gasolene engines, as well as measuring the fluid pressure in tires. In order to measure the fluid pressure in any engine, my device is provided with threaded portions whereby the body member may be applied to a threaded opening in a device, the fluid pressure of which is to be gaged. If on the other hand it were desired to measure the pressure in tires, there is provided a valve trip fitting adapted to be applied to the body member and having an air duct gaging the pressure. This air duct communicates with the channeled portion which forces an indicator member upward against yielding means, which means ordinarily holds the indicating member chambered.

With the above and other objects in view, the invention consists in the novel and useful provision, formation, combination, association and relative arrangement of parts, members and features, all as hereinafter described, shown in the drawing and finally pointed out in claims.

In the drawing.

Corresponding parts in all the figures are designated by the same reference characters.

Figure 3:
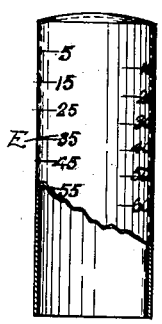
Fig. 3 is a fragmentary side view of the indicator member, parts being broken away to show the construction of same.
Figure 2:
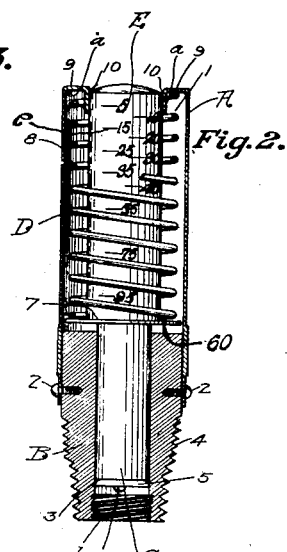
Fig. 2 is a cross-sectional view of the device shown in Fig. 1.

Referring with particularity to the drawing, the gage device shown as embodying the invention comprises a body member A and which is chambered as at 1 with a terminal fitting B telescoping within said body member A and being held to said body member A by suitable means as 2. This latter member B is shown as formed with a longitudinal bore 3. The member B is exteriorly threaded as at 4, said threaded areas having two portions of different external diameter whereby the application of the body member may be applied to openings having different diameters, such as in the spark plug openings of a cylinder, and whose compression is to be measured. The threaded portions 4 of the terminal fitting B are preferably tapered so that they will wedge themselves in the spark plug opening of an engine cylinder and produce an airtight joint therewith. The tubular plunger C is provided at its lower extremity with a washer 5 which is held in position to said tubular member C by suitable means 6ª and is for the express purpose of preventing a leakage of fluid pressure around the edges of the plunger. The member C is likewise provided with an exterior laterally projecting flange portion 6 at its opposite end. A yielding means D shown as a helical compression spring rests normally on the flange portion 6 of the member C as shown in Fig. 2 at 7. The housing A has bent over portions at one end to form a channel *a*. This channel *a* is shown in Fig. 2 in the form of a U, that is, the member or housing A is provided with an extended side member 8, a portion 9 at right angles to said extended side member 8 and a resilient flange 10 parallel with the member 8 and extending downwardly within the interior of the member A. It is the portion *a* formed by the members 8, 9 and 10 which holds the opposite end of the resilient member D in position at one end. Sliding within the flange 10 is an indicating means E having readings e thereon. The member E rests normally upon the flange 6 of the member C. The resilient flange 10 holds said indicating member E normally in position so that there is no side play and frictionally engages the same to hold it in an adjusted position. The member B is provided with an internally threaded portion b at the lower end of the bore 3. This threaded portion b is to accommodate the valve trip fitting F provided with exterior threads 11 having the same pitch as the threads of b. The member F is provided with a rabbeted portion 12, and an inner channeled portion 13, said rabbeted portion forming a part of the inner channeled portion. A valve trip f extends co-axially downwardly within the inner channeled portion 13 of the member F and said valve trip fitting f is provided with an air duct 14 extending through said member f.

The member F screws within the member B and is held in position by the threads b and 11 co-acting with one another. Surrounding the valve trip fitting f and in the rabbeted portion 12 of the member F is a washer 15; this washer is for the express purpose of preventing side leakage of air when the valve trip fitting f is placed over the valve of the body member having an air duct, so that the air may be directly removed and passed through the air duct 14 against the washer 5 of the member C. The body member A is likewise provided with a knurled portion 16 to facilitate placing the member A and screwing same into any threaded portion such as a cylinder where compression is to be measured.

Figure 1:
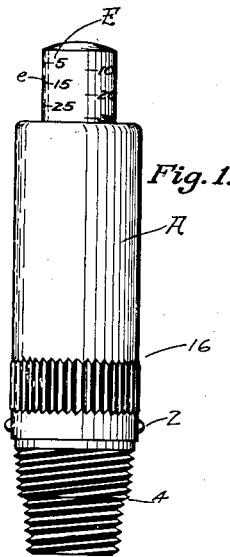
Figure 1 is a side view showing the improved gage device embodying the invention, the same showing readings on the indicator member.
Figure 4:
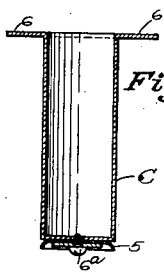
Fig. 4 is a cross-sectional view of the tubular extension which communicates with the indicator member as shown in Fig. 2; and, Fig. 5 is a cross-sectional view of the valve tip fitting adapted to be applied to the body member.
Figure 5:
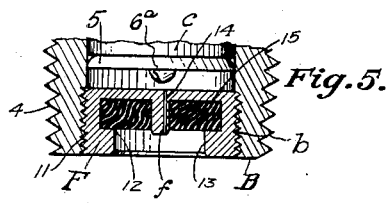

The operation is as follows:

When air is passed through the duct 14 or other fluid pressure is passed through the duct 14, said pressure exerts a force against the washer member 5 of the member C and forces the member C upwardly in the bore 3 of the tubular member B. The upward movement of the member C is arrested by the yielding means D housed within the member A. The member C in turn pushes the member E upwardly, and the housing A and the member E bear such a relation that when the member E is extended from the housing A as shown in Fig. 1 the readings e upon the member E directly state the pressure exerted when the piston or member C pushes same upwardly. The member E is held in position by the resilient flange 10 of the body member A by friction, and the said flange 10 holds the member E so that the readings e may be observed until it is desired to push the member E back into its housing, this latter operation being accomplished manually, that is, by pressure exerted by the finger of the operator, thus restoring it so that it abuts against the flanges 6 of the member C.

It is obvious that many variations may be made in departure from the foregoing disclosure and description, and the accompanying drawing, without departing from the true spirit of the invention.

Having thus disclosed my invention, I claim and desire to secure by Letters Patent:

1. A fluid pressure gage including a tubular terminal fitting, a hollow body member carried by the terminal fitting and having an opening therein, a slidable indicator rod normally housed within the hollow body member and adapted to be projected outwardly through the opening of the body member, said indicator rod being formed with a scale which coöperates with the body member to indicate pressure and being frictionally engaged by the edges of the opening to hold it against accidental movement, a plunger slidable within the terminal fitting and extending into the hollow body member for engagement with the indicator rod to project the same through the opening of the hollow body, an exterior flange upon the plunger, and a spring surrounding the indicator rod and interposed between the said flange of the plunger and the walls of the hollow body to resist the movements of the plunger.

2. A fluid pressure gage including a tubular terminal fitting, a hollow body member projecting from the terminal fitting and formed in the end thereof with a flanged opening which is surrounded by a spring engaging seat, an indicator rod normally housed within the hollow body and slidable through the flanged opening thereof, said indicator rod being provided with a scale for coöperation with the end of the hollow body to indicate pressure, and being frictionally held against accidental movement by engagement with the edges of the flanged opening, a plunger slidable in the terminal fitting and extending into the hollow body for engagement with the indicator rod to move the same into a projected position, an external flange on the plunger, and a coil spring surrounding the indicator rod and interposed between the flange of the plunger and the before-mentioned spring engaging seat of the hollow body member.

3. A combination tire pressure and cylinder compression gage, including a tubular terminal head which is exteriorly threaded for engagement with the spark plug opening of an engine cylinder, a tire valve-engaging seat applied to the terminal head, a plunger slidable in the bore of the terminal head, and pressure indicating means operatively associated with the plunger to indicate the interior pressure of the tire or the compression of the engine cylinder, to which the gage is applied.

4. A combination tire pressure and cylinder compression gage, including a tubular terminal head provided exteriorly with a plurality of threaded portions which are of different diameters and provided for engagement with different sizes of spark plug openings, a tire valve-engaging seat fitted in the bore of the tubular head, a plunger slidable in the terminal head, and pressure indicating means operatively associated with the plunger for indicating the interior pressure of the tire or the compression of the engine cylinder, to which the gage is applied.

In testimony whereof, I have signed my name to this specification in the presence of two subscribing witnesses.

JOHN J. FITZGERALD.

Witnesses:
MILDRED LEACH,
J. SHUTT.